Fig. 1

INVENTOR.
THOMAS H. DUFFY.
BY Alden D. Redfield
Warren Kunz
ATTORNEYS.

United States Patent Office 2,976,523
Patented Mar. 21, 1961

2,976,523

ELECTRONIC CIRCUIT FOR ANTICIPATING CHANGE OF MAGNITUDE OF A QUANTITY UNDER INVESTIGATION

Thomas H. Duffy, Fairfield, Conn., assignor to Avco Manufacturing Corporation, Cincinnati, Ohio, a corporation of Delaware Filed Oct. 1, 1956, Ser. No. 613,316

6 Claims. (Cl. 340—231)

The present invention relates to an electronic circuit, that determines and is responsive to the second derivative of a changing potential with respect to time, for energizing a second circuit when the value of the second derivative exceeds a predetermined value. The potential to which the circuit is responsive may be proportional to the magnitude of any quantity under investigation, such as temperature or pressure existing in a structural member.

Although the circuit is responsive in its operation to the second derivative, or acceleration, of an existing potential proportional to the quantity under investigation, the value of the acceleration of the existing potential serves to indicate how the quantity will probably change at a future time; hence, the circuit is deemed to "anticipate" or "predict" the change. The nature of the change—whether it is objectionable in size—is of primary interest. An exact prediction of the actual value that the quantity will attain is not necessary for the purposes of the present invention.

More specifically, the invention relates to such a circuit which is responsive to the second derivative of temperature with respect to time. When arranged for this purpose, the circuit may be utilized to predict the probable temperature change in a member, such as a bearing. In such applications, the function of the circuit is normally that of anticipating temperature rise in the bearing and indicating a dangerous incipient condition prior to bearing failure; the same circuit may be used, however, for anticipating a drop in temperature.

As will be appreciated by those skilled in the art, there is a very real need today for a device which will anticipate bearing failure before it actually occurs. The conventional test instrument now in use is simply a thermocouple which indicates the prevailing temperature of the bearing. In most instances, material damage is done to the bearing by the time that its excessive temperature is noted. In other words, conventional instruments have no ability to extrapolate from existing values to predict temperature conditions that will probably exist at a future time. As a result, such major damage is usually done to the bearing that at a later time it is impossible to determine the nature and cause of the failure and what corrective steps might be necessary.

In contrast, the present invention can extrapolate from known conditions to predict or anticipate the probable development of a condition dangerous to the bearing. In fact, by use of the present invention, it has been possible to develop equipment having bearings operating under high load without ever having damaged a bearing. The importance of such an instrument in the research and development field is immense, although its use is not limited to such fields; it is also valuable in connection with operation of existing commercial equipment.

In brief, the preferred embodiment of the invention comprises an electronic system including a thermocouple and a balancing circuit which together produce a D.C. potential which is indicative of the temperature of the bearing above a standard reference temperature. The output of the balancing circuit is converted into an A.C. potential, the amplitude of which is proportional to the D.C. potential. The A.C. potential is then amplified and subsequently rectified to yield a D.C. potential proportional to the output of the balancing circuit but much larger in magnitude. This D.C. potential is filtered and is then fed into a two-stage differentiating network which yields a potential (called "acceleration potential") which is proportional to the acceleration of the rectified D.C. potential. This acceleration potential is then amplified and impressed on the control grid of a thyratron tube. The tube is triggered by an acceleration potential above a preselected value, and a control relay is operated thereby to energize warning indicators and/or means for terminating operation of the mechanism being investigated.

The same circuit may also be used to anticipate fall of temperature, as mentioned earlier. Further, with minor modification the circuit may be made responsive to rise or to fall of pressure. In fact, depending upon the transducer which is used, the circuit may be used to anticipate change of magnitude of any quantity under investigation.

In view of the foregoing, it will be apparent that it is a broad object of the present invention to provide a circuit which may be used to anticipate change of magnitude of a quantity under investigation.

Further objects of the invention are to provide the following:

(1) An electronic circuit which determines and is responsive to the second derivative of a changing potential with respect to time for energizing another circuit when the second derivative exceeds a given value.

(2) An electronic circuit that is effective in amplifying a D.C. potential, which is proportional to a quantity under investigation, and in determining and utilizing the acceleration of the potential for control purposes.

(3) An instrument that may be used to predict the probable nature of temperature changes.

(4) A temperature sensing device producing a D.C. potential proportional to the departure of the temperature from a standard reference temperature, which is double differentiated to yield a potential proportional to the acceleration of the temperature.

(5) A thermocouple balancing circuit that may be utilized to establish a zero reference potential which is indicative of a standard reference temperature.

(6) A bridging circuit in a temperature anticipating device which will function to energize a control circuit in the event that objectionable temperatures are attained at a rate of increase having zero acceleration.

The novel features that I consider characteristic of my invention are set forth in the appended claims; the invention itself, however, both as to its organization and method of operation together with additional objects and advantages thereof, will best be understood from the following description of a specific embodiment when read in conjunction with the accompanying drawings in which:

Figure 3 is a diagrammatic representation of a bearing being tested with the aid of a device shown in Figures 1 and 2;

General arrangement

Before considering any of the details of the present device, it will be helpful to understand its general arrangement. Indicated at 1 is a transducer which may consist of an iron-constantan thermocouple for measuring the temperature being investigated. The D.C. potential output of the transducer is supplied to a balancing circuit including a variable resistor 2 which may be adjusted to "balance" or "null" the output of the transducer so that the net output of the balancing circuit will be zero at a predetermined reference temperature. The exact reference temperature is a matter of choice for the particular investigation being made and may be established through adjustment of resistor 2 at a level above, or below, which temperature change is of interest. The balancing circuit also includes a chopper 3 and a transformer 4, the output of which is an A.C. potential wave proportional in amplitude to the D.C. output of the transducer above, or below, as the case may be, its reference point. The frequency of the A.C. wave is immaterial for the purposes of this invention.

Following the transformer is an amplifier section which increases the amplitude of the A.C. wave to a more useable value. The output of the amplifier section is supplied to the primary of transformer 5. The secondary of this transformer is connected to a selenium bridge rectifier 6 which rectifies the A.C. wave and yields a D.C. potential proportional in magnitude to the magnitude of the amplified A.C. wave. This D.C. output is filtered in the following filter section and is then differentiated twice by a first and a second differentiating circuit. The voltage output of the second differentiating circuit is then amplified and delivered to a control circuit. This amplified potential is proportional to the acceleration and sense (polarity) of the acceleration of the transducer potential above its null point.

The control circuit includes a thyratron 7 which is so biased that it is triggered by the amplified acceleration potential when it attains or exceeds a predetermined value. When the thyratron is triggered, a flow of current is established through relay 8 that closes switch 9 to deliver current to a plurality of output terminals 10 which may be used to energize warning and protective devices.

It will be noted that a full wave rectifier is used to supply power to the system.

In partial summary, therefore, it will be noted that, by means of the present device, a potential is impressed on a thyratron tube in a control circuit which is proportional to the sense and magnitude of the acceleration of the temperature being sensed by the transducer.

As will be understood fully from later remarks, the invention lends itself equally well to studies of falling temperatures as well as rising temperatures. For simplicity, however, the invention will first be described in an application involving temperature rise. Accordingly there is shown in Figure 3 a typical bearing 11 with which thermocouple 1 is associated. It will be understood that during normal operation of the bearing under consideration the temperature rises and eventually stabilizes at a constant equilibrium value. A bearing operating with insufficient lubrication, or overloaded, or defective, fails by overheating to the point of destruction.

Mathematical considerations

The function and purpose of the present invention will best be understood by reference to a series of curves illustrating typical temperature vs. time relationships of bearings in the process of failing or operating in a safe manner.

Figure 4:
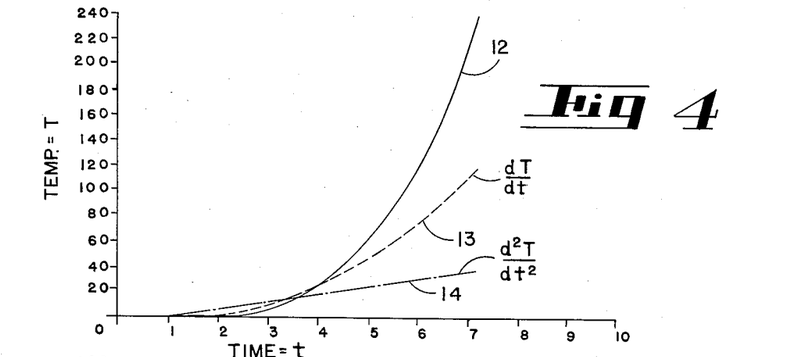
Figure 4 is a graphic representation of the temperature vs. time relationship of a bearing in the process of overheating. Also shown is a plot of the first derivative and second derivative of the temperature with respect to time.

Attention is first directed to Figure 4. Shown in full lines at 12 is a plot of temperature vs. time for a bearing which is overheating and slated for destruction. For convenience an exponential curve has been assumed according to which temperature is a function of the third power of time.

Shown in dash lines at 13 is a curve illustrating the first derivative of curve 12. In other words, this curve illustrates the velocity of temperature change.

Shown in phantom lines at 14 in Figure 4 is a curve illustrating the second derivative, or acceleration, of the temperature vs. time relationship illustrated by curve 12. It will be noted that whereas the first derivative is a parabolic function, the second derivative is a straight line function.

Studying the curves more closely, it will be noted from zero to time=1, the temperature remains constant at a zero reference value. Naturally, during this time the velocity and acceleration also remain zero. At time=1 the transducer begins to sense a temperature increase which gradually rises exponentially as illustrated by curve 12. The temperature accelerates linearly, as illustrated by curve 14. It will be clear from curve 12 that the temperature of the bearing increases rapidly with no indication of seeking an equilibrium condition. This is also illustrated by the constantly increasing acceleration. It will be apparent that by energizing the control system for a given value of acceleration, such as that prevailing at time=7, the bearing could be saved before attaining destruction temperatures. Thus, to illustrate, a temperature of 400° above reference, which is assumed to be destructive, would only be attained at time=8.4. This may be easily anticipated by the present device which notes the rise of acceleration to the preselected control value at time=7, well in advance of the attainment of destructive temperatures by the bearing.

Figure 5:
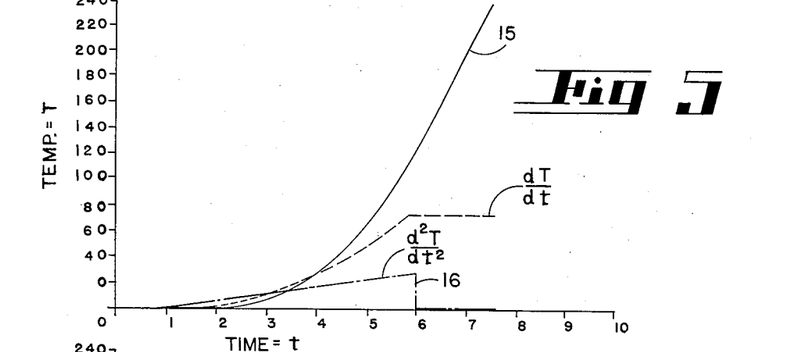
Figure 5 is another plot of bearing temperature with respect to time illustrating increase of bearing temperature linearity with respect to time, eventually leading to destruction of the bearing. Also shown is a plot of the first and second derivatives of the temperature with respect to time.

Attention is now directed to Figure 5 which illustrates another type of destructive temperature rise. Here, the relationship of temperature with respect to time is shown by full line curve 15. This curve is a cubic function from time=1 to time=6 and thereafter is linear. As would be expected, the acceleration curve 16 is a straight line function to time=6. Thereafter the temperature increases linearly, and the acceleration drops to zero at which value it remains during the remainder of the time.

This is a special, and somewhat unusual, case. It will be recognized, however, that bearing failure will also result in this instance even though the temperature vs. time relationship has zero acceleration after time=6. For this reason, the electronic circuit of this device includes a bridging circuit to prevent bearing failures resulting from linear increase of tempgerature at zero acceleration.

Figure 6:
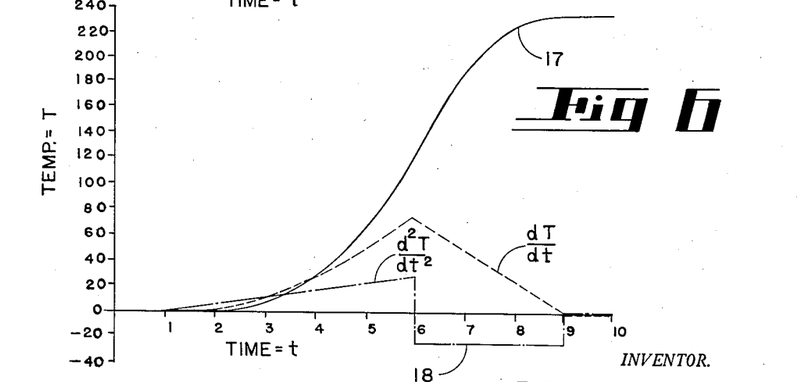
Figure 6 is a graphic representation of the temperature vs. time relationship of a bearing which attains equilibrium operating temperature after an initial warm-up. Also shown is the plot of the first derivative and second derivative of temperature with respect to time.

Attention should now be directed to Figure 6. Here, the full line curve 17 represents a gradual increase of bearing temperature, eventually equalizing at a temperature of 237° above the standard reference temperature. For illustrative purposes the first portion of the curve from time=1 to time=6 has again been assumed as a cubic function, i.e. temperature is a function of the third power of the time. From time=6 to time=9 the curve is an inverted parabola. The two curves have a common tangent at time=6.

It will be noted that the acceleration curve 18 is linear from time=1 to time=6. At time=6 the acceleration drops to a minus value where it remains until the temperature stabilizes at time=9. After this point, acceleration curve 18 has a value of zero, reflecting a constant equilibrium bearing temperature.

These curves are significant in several respects. In connection with Figure 4 it will be noted that the acceleration curve is positive and continuously increasing in value as the temperature rises. Well in advance of an excessive temperature, the acceleration attains a significant value. Any particular value of acceleration can be utilized to trigger the control system and, as an illustration, the value of acceleration at time=7 could be used. Under the assumed conditions, this value of acceleration would be attained long before overheating of the bearing under investigation, which could be saved from destruction and subjected to subsequent examination to determine why it had increased in temperature at a destructive rate.

In contrast, the curves of Figure 6 illustrate that after an initially rapid rise, temperature increased less rapidly, eventually attaining an equilibrium condition. Here, the acceleration was positive until time=6 at which point it dropped to a negative value and eventually stabilized at a zero value at time=9 and thereafter. It is important to note that for this stable operating condition the acceleration curve never attained a value suitable for energizing the control circuit. The approach of stable bearing temperatures was signified and anticipated by a period of negative temperature acceleration. Temperature equilibrium was designated by continuing zero acceleration. Thus, for a condition of stable operation the control system would never be energized.

More will be said about the special condition illustrated in Figure 5 later in the specification in connection with the description of the bridging circuit.

It will be recognized that all values of time and temperature have been arbitrarily assumed for illustrative purposes. What constitutes a "destructive temperature" is obviously a function of the bearing being investigated. The units of time are arbitrary and could be measured in seconds, or minutes, or other units suitable for the rate of temperature increase of the particular bearing.

It should be observed that the control system is energized when the acceleration exceeds a predetermined value. The existence of such a value indicates the probability that the temperature of the bearing will in all likelihood attain destructive proportions. This signifies a condition requiring investigation before anticipated high temperatures are attained or the bearing is damaged.

*Details of the electronic circuit*

For convenience the power supply of the system will first be described.

Power is supplied to the system from a 117 volt A.C. supply through connections 19. The power supply includes a transformer 20 with multiple secondaries 21, 22, and 23. Secondary 22 is in circuit with a double diode 24, the heater 25 of which is energized by secondary 23. The rectified D.C. output of the diode, impressed on lines 26 and 27, is subsequently filtered by a condenser input filter including condensers 28 and 29 and an inductance 30. Because of the connections to the diode, line 26 is maintained at a minus potential and line 27 at a plus potential.

Two resistors 31 and 32 are connected in series by line 33 and together constitute a bleeder resistor across lines 26 and 27. As will be understood by those skilled in the art, resistor 31, in series with resistor 32, constitutes a voltage divider having line 33 grounded to the chassis at 34. In this way, the chassis is maintained slightly positive with respect to line 26.

D.C. potential of approximately 250 volts is supplied to line 36 through resistor 35. Line 36 supplies other portions of the circuit to be discussed subsequently.

Figures 1, 2:
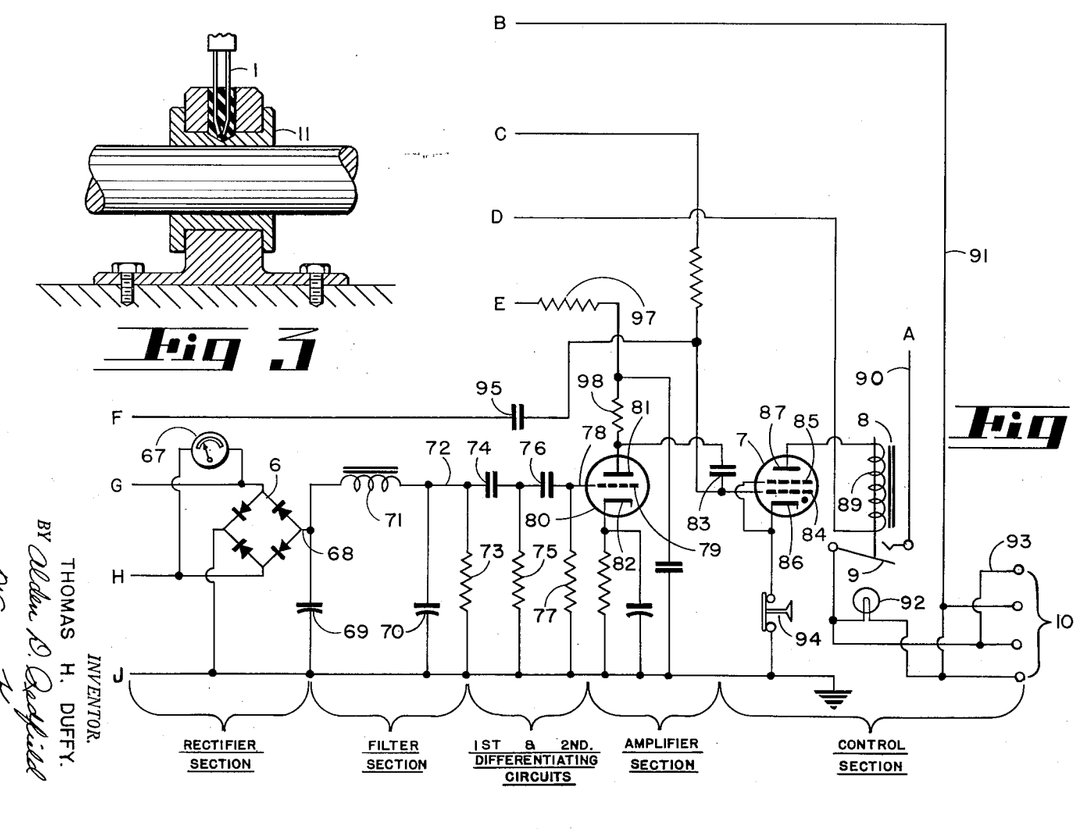
Figures 1 and 2 are schematic representations of the novel temperature anticipating device.
Figure 1:
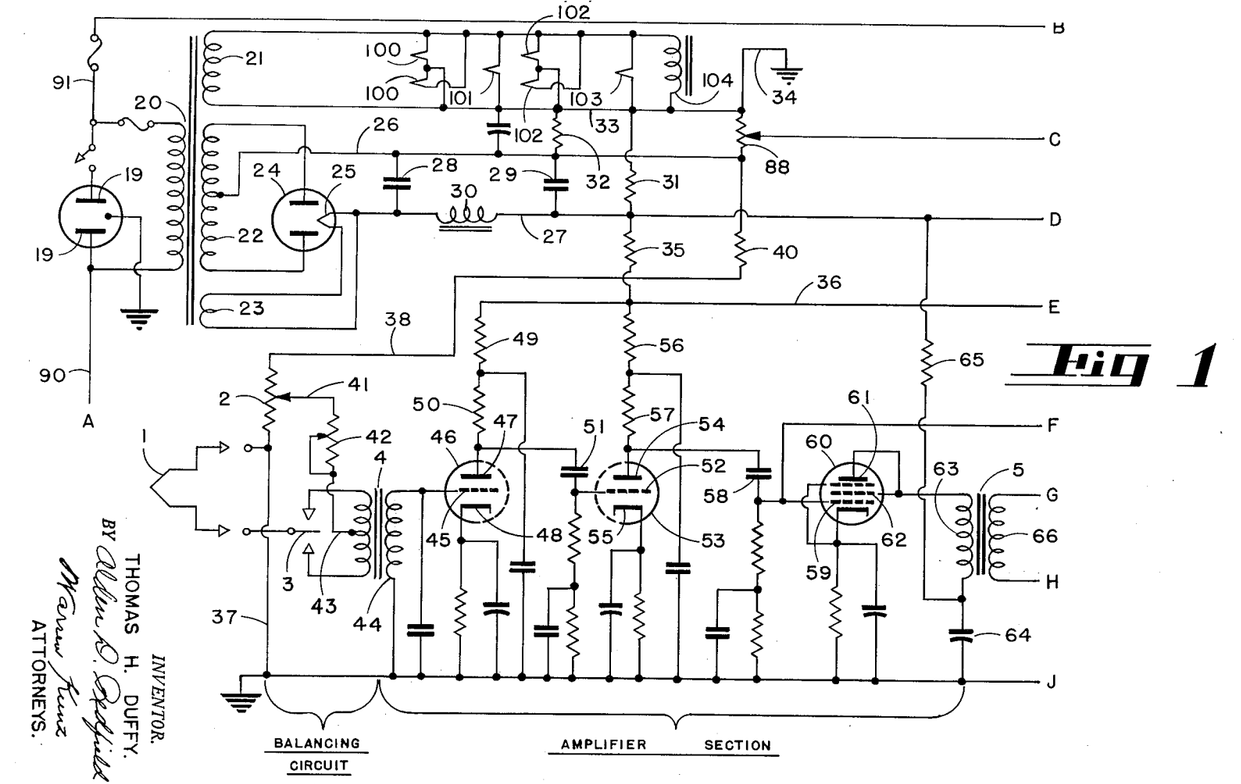

With further reference to Figure 1, it will be noted that the positive side of the transducer is connected to the chassis through line 37 and the negative side is connected to chopper 3. Line 38, including variable resistor 2 and fixed resistors 40 and 88 interconnects the ground at 34 with the positive side of the transducer. A variable tap 41 on the resistor 2 is connected through variable resistor 42 to center tap 43 of the primary of transformer 4. By varying the adjustment of the tap 41 the potential of the transducer can be "bucked" or "nulled" by an equal potential of like polarity. With the aid of variable resistor 42, as will be explained, the output of the transducer is calibrated at zero value at a standard reference temperature which may be established to suit the particular investigation being made. It is assumed in the curves of Figures 4, 5, and 6 that the transducer has been nulled for temperature=0.

Thus it will be apparent that the A.C. potential produced in secondary 44 of transformer 4 will have an amplitude proportional to the transducer potential above the null point or reference point. This A.C. wave is supplied to grid 45 of triode 46 which includes plate 47 and cathode 48. D.C. potential from line 36 is supplied to the plate through resistors 49 and 50.

The plate potential is capacitance-coupled by condenser 51 to the grid 52 of triode 53 constituting the next stage of the amplifier. This triode also includes a plate 54 and a cathode 55. In this instance D.C. potential from line 36 is supplied to the plate through resistors 56 and 57. The plate potential is capacitance-coupled through capacitor 58 to the control grid 59 of pentode 60. The pentode includes plate 61 which is directly connected to screen grid 62 which in turn is connected through primary 63 of transformer 5 and condenser 64 to ground. Positive D.C. potential from line 27 is supplied to the opposite end of the transformer primary through resistor 65.

As a result, an amplified A.C. wave is produced in secondary 66 of transformer 5. The amplitude of the A.C. wave is still proportional to the potential of the transducer above the reference value but is greatly increased in magnitude.

At this point attention should be directed to Figure 2 which shows the remainder of the circuit. It will be noted that the bridge rectifier 6 is connected across the secondary 66 of transformer 5 and that an A.C. volt meter 67 is also connected across the secondary 66. Adjustment of tap 41 of resistor 2 can be effected by observing meter 67 which indicates when the transducer is nulled at the standard reference temperature then being sensed by the transducer. This plus adjustment of variable resistor 42, as will be explained, establishes the zero reference calibration of the system.

The bridge rectifier produces a varying D.C. potential in line 68 which is proportional to, but much greater in magnitude than, the D.C. potential of the transducer above its zero reference. The D.C. potential from line 68 is then filtered through a low pass filter including condensers 69 and 70 and inductance 71. The filtered D.C. then is applied to line 72. Bleeder resistor 73 extends from line 72 to ground.

The filtered D.C. is then supplied to the first circuit of a double differentiating network. The first differentiating circuit includes condenser 74 and resistor 75. The output of this circuit is supplied to the second differentiating circuit including condenser 76 and resistor 77. As a result, there is delivered to line 78 a potential equal in magnitude but opposite in sign, i.e. polarity, to the acceleration of the D.C. potential existing in line 72. This acceleration potential is impressed on control grid 79 of triode 80. The triode includes plate 81 and cathode 82. D.C. potential from the power supply is fed through line 36 and resistors 97 and 98 to the plate 81. The amplified output of tube 80 is then capacitance-coupled through condenser 83 to control grid 84 of thyratron tube 7. The thyratron includes a suppressor grid 85 connected to cathode 86 and also includes plate 87.

It will be noted that the control grid 84 is biased at a negative potential with respect to ground by virtue of resistor 88 in the power supply section. This resistor is variable and may be adjusted to bias the grid at a desirable negative polarity with respect to ground, and hence cathode 86. The acceleration potential in the process of being amplified and being impressed on the control grid 84 undergoes a reversal of polarity. The amplified acceleration potential must overcome the negative bias potential of the grid in a positive direction before the thyratron 7 will be triggered. In other words, variable resistor 88 constitutes an adjustment whereby the value of the amplified acceleration potential that will trigger the thyratron is established. For example, resistor 88 could be adjusted to oppose the acceleration potential successfully at all values below that existing at time=7 of curve 14 in Figure 4. When the acceleration potential exceeds this bias, the thyratron is triggered and establishes a continuous flow of current from line 27 to plate 87 and through cathode 86 to ground. This current also flows through coil 89 of relay 8. Current flowing in the coil closes switch 9 and completes the circuit from 117 v. A.C. power lines 90 and 91 through warning light 92. In addition to the warning light, a warning siren or other warning and protective devices can be energized from output leads 93. For instance, energization of the output leads can be made to operate another relay (not shown) cutting off the supply of power to the shaft supported by the bearing under test.

Current will continue to flow through the relay 8 until actuation of push button 94 which will break the circuit and reset the device for further operation.

Attention should now be directed to bridging capacitor 95. This capacitor is connected between grid 59 and grid 84. In this way A.C. potential from the second stage of the amplifier is impressed on the control grid 84 of tube 7. When the amplitude of the positive portion of this A.C. wave equals or exceeds the valve of the potential in grid 84 which is sufficient to trigger thyratron 7, the control system will be energized regardless of the particular acceleration potential then existing.

The importance of the bridging capacitor 95 can be understood by reference to the curves of Figure 5. As illustrated by curve 15, the temperature increases linearly to destructive proportions. Because of the linear relationship, the acceleration of the curve is zero and, but for bridging circuit, the control system would never be energized. However, when a sufficiently high temperature has been sensed by the transducer, the bridging circuit will impress a potential on grid 84 sufficient to trigger the thyratron 7. The temperature at which this will occur is determined by the adjustment of resistor 88 and can be established at any desirable valve low enough to assure that the bearing will not actually attain a temperature sufficient to cause destruction.

It would be extremely unusual to encounter a bearing which in operation increases in temperature linearly with respect to time. Hence, bridging capacitor 95 normally remains ineffective and energization of the control system is a function of the acceleration potential.

It will be noted that a negative acceleration, such as illustrated by curve 18 of Figure 6, results in such a relatively large negative amplified acceleration potential applied to grid 84 of tube 7 that the thyratron is not triggered. At zero acceleration grid 84 is biased at cut-off and the control system remains inoperative.

It will be understood that secondary 21 of the power supply provides energy for heaters 100—103 of the vacuum tubes 46, 53, 60, and 80. In addition, power is supplied to coil 104 which actuates chopper 3 at line frequency.

The foregoing description has been largely devoted to circuit operation resulting from increasing temperature. It should be observed that the system is equally effective in determining and responding to deceleration of a falling temperature.

To understand operation of the system in connection with decreasing temperatures, it should be recognized that the transducer and balancing circuit, shown in Figure 1, produces in secondary 44 of transformer 4 an A.C. potential having an amplitude proportional to the increase of transducer temperature above the null point. It will be recognized that an identical A.C. wave will be produced in secondary 44 by an equal decrease of transducer temperature below the null point. Increasing temperature-time relationships, such as shown in curves 12, 15, and 17, result in acceleration curves 14, 16, and 18, respectively. Decreasing temperature-time relationships, which are the mirror images of curves 12, 15, and 17 about the abscissa, result in identically the same curves as 14, 16, and 18, respectively. Thus the circuit can anticipate the probable drop of temperature into an objectionable range signified by attainment of a given valve of the second derivative of temperature with respect to time.

Figure 7:
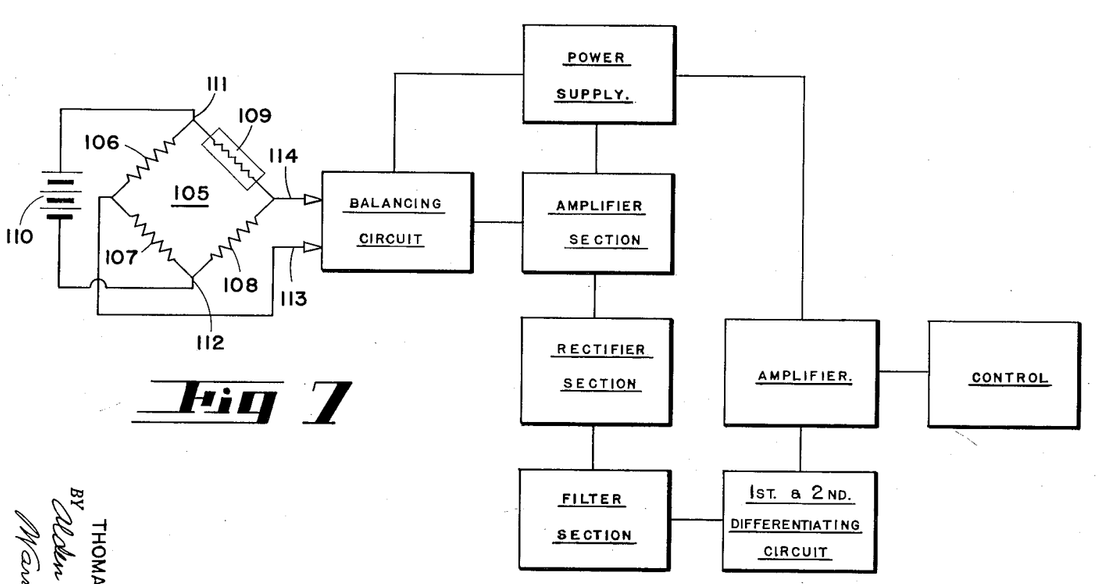
Figure 7 is a schematic representation of the invention when adapted for use in anticipating pressure changes.

Attention should now be directed to Figure 7. This figure illustrates the circuit as it could be arranged to study changes in pressure, either above or below a reference point. A Wheatstone bridge 105 is provided including three fixed resistors 106, 107, and 108. The fourth resistor 109 in the bridge is in the form of a strain gauge, such as is known in the art.

A battery 110 is connected across the bridge at 111 and 112 and lines 113 and 114 are connected across the bridge constituting leads to the circuit of Figure 1 replacing the output leads of transducer 1.

To illustrate this use of the invention, the strain gauge can be considered attached to the wall of a pressure vessel. The change of resistance in 109, resulting from strains in the wall incidental to the pressure in the vessel, unbalances the Wheatstone bridge and produce a D.C. potential in lines 113 and 114. In a manner similar to that explained earlier, this potential is nulled to produce a D.C. potential proportional to the increase of pressure above the nulled standard reference value. As a result of the balancing circuit, an A.C. potential is produced having an amplitude proportional to the D.C. potential above null.

The operation of the circuit is otherwise identical and the control system can be energized when the acceleration of pressure within the vessel exceeds a predetermined value.

It will be understood from the earlier discussion that the strain gauge arrangement can also be used to study decreases of pressure. In fact it will be apparent that the circuit lends itself to use of the strain gauge for studying any phenomenon which is capable of registering a change in quantity by change of resistance of the strain gauge.

Thus the invention is susceptible to very wide application. In fact it may be used wherever a quantity is under investigation which can be represented by a D.C. potential proportional to the quantity. Use of the invention is not restricted, however, to applications involving D.C. potentials. To illustrate, an A.C. potential having an amplitude proportional to a quantity under investigation could be impressed directly across the connections of the secondary 44 of transformer 4, in place of secondary 44. Operation of the remainder of the system will otherwise be identical.

Zero adjustment

Although, in theory, nulling of the output of transducer 1 for any given reference temperature should result in the same null or zero reading on meter 67, as a practical matter it has been found that the null point shifts slightly as resistor 2 is adjusted to standardize the circuit for different reference temperatures. Due to extraneous effects which are difficult to identify, a small current flows in the circuit including the chopper 3 even at null condition. The size of the current depends upon the resistance of that portion of resistor 2 which is included in the circuit. For this reason, it has been found practically desirable to provide a variable resistor 42 as indicated in Figure 1. With the circuit arranged in this way, it is possible to compensate for the change of resistor 2 incidental to standardization at different reference temperatures and to maintain a given null point on meter 67, which may for all purposes be regarded as the zero reference. Thus, as a practical matter, variable resistor 42 serves as a zero adjustment.

Summary

In summary, it is pointed out that the preferred embodiment of the present system is designed to respond to the acceleration of temperature with respect to time as manifested by an amplified acceleration potential impressed upon the grid of a thyratron tube. This potential is indicative of the acceleration of a relatively large D.C. potential which is proportional to the D.C. potential of the transducer above its zero reference, but much larger in magnitude. The control circuit of the system is also designed to be rendered operative by an A.C. potential, the amplitude of which is proportional to the transducer output above zero reference. Operation in this manner will only result from linear temperature increase above a predetermined value.

It will be noted that the system includes only three basic adjustments: Resistor 2 is adjusted to establish null condition at meter 67, and resistor 42 is adjusted to establish meter zero at meter 67, when the transducer is at a standard or zero reference voltage; resistor 88 is varied to determine both the value of acceleration potential which, when amplified, will trigger the thyratron to energize the control circuit and the temperature at which sufficient A.C. potential will be applied to trigger the thyratron in the event of a linear increase of temperature at zero acceleration.

The circuit may also be used to study decreasing temperatures and is readily adapted to the study of strain measurements and pressures. Both A.C. and D.C. signals will operate the circuit.

Having described a preferred embodiment of my invention, I claim:

1. In combination in a device for anticipating bearing failure through temperature rise, a thermocouple for generating a direct current potential proportional to the temperature of the bearing, a balancing circuit for nulling the potential of said thermocouple when it is at a standard reference temperature, said circuit including a chopper and a transformer for generating an alternating current potential wave having an amplitude proportional to the potential of said thermocouple above the null point, an amplifier for amplifying the alternating current output wave of said balancing circuit, a rectifier for rectifying the alternating current wave from said amplifier to produce an amplified direct current potential proportional to the potential of said thermocouple above the null point, a cascaded double differentiating circuit for producing an acceleration potential proportional to the acceleration of the direct current potential output of said rectifier, an amplifier for amplifying the acceleration potential, and a thyratron control circuit trigged by the acceleration potential when it exceeds a predetermined value whereby indication is given of anticipated bearing temperatures dangerous to the bearing.

2. In combination, in a device for anticipating temperature change, a transducer producing a direct current output potential proportional to the temperature being measured, a balancing circuit including means for nulling the output of said transducer when it is at a standard reference temperature, a chopper and transformer for producing an alternating current potential having an amplitude proportional to transducer potential above the standard reference level, a cascaded amplifier for amplifying the alternating current potential, a transformer and bridge rectifier for converting the amplified alternating current potential to a direct current potential proportional to the amplitude of the amplified alternating current potential, a condenser input filter for filtering the direct current potential from said bridge rectifier, first and second differentiation circuits for producing an acceleration potential proportional to the acceleration of the direct current potential from said bridge rectifier, an amplifier including a control grid on which is impressed the acceleration potential from said second differentiating circuit, and a control circuit including a thyratron including a cathode and a control grid, the amplified acceleration potential being impressed upon the control grid of said thyratron and the cathode being biased to prevent current flow in the control circuit until the acceleration potential equals or exceeds a predetermined value, and a direct current power supply for said balancing circuit, amplifiers and control circuit.

3. In combination in a device for anticipating bearing failure through temperature rise, a thermocouple for generating a direct current potential proportional to the temperature of the bearing, a balancing circuit for nulling the potential of said thermocouple when it is at a standard reference temperature, said circuit including a chopper and a transformer for generating an alternating current potential wave having an amplitude proportional to the potential of said thermocouple above the null point, an amplifier for amplifying the alternating current output wave of said balancing circuit, a rectifier for rectifying the alternating current wave from said amplifier to produce an amplified direct current potential proportional to the potential of said thermocouple above the null point, a cascaded double differentiating circuit for producing an acceleration potential proportional to the acceleration of the direct current potential output of said rectifier, an amplifier for amplifying the acceleration potential, a thyratron control circuit triggered by the acceleration potential when it exceeds a predetermined value whereby indication is given of anticipated bearing temperatures dangerous to the bearing, and means for impressing on said thyratron a potential proportional to the amplitude of the amplified alternating current potential wave whereby said thyratron will be triggered when the amplitude exceeds a predetermined value.

4. In combination in a device for anticipating temperature rise, a transducer responsive to the temperature being investigated for producing a direct current potential proportional to the temperature, a balancing circuit for producing an alternating current potential wave having an amplitude proportional to the rise of transducer temperature above a predetermined reference temperature, means for amplifying the alternating current wave, means for rectifying the amplified alternating current wave to produce a direct current potential proportional to rise of transducer temperature above the reference temperature, a cascaded double differentiating circuit for producing an acceleration potential proportional to the acceleration of the direct current potential output of said rectifier, and means including a thyratron tube having a control grid biased proportional to acceleration potential, said thyratron including a cathode biased to become conductive when the acceleration potential exceeds a predetermined value, and a direct current power supply for said balancing, amplifier, and control circuits, and a bridging circuit for impressing on the grid of said thyratron tube the amplified alternating current potential wave whereby said thyratron may also be triggered when the amplitude of the alternating current potential exceeds a predetermined value.

5. In combination, in a device for anticipating temperature change, a transducer producing a direct current output potential proportional to the temperature being measured, a balancing circuit including means for nulling the output of said transducer when it is at a standard reference temperature, a chopper and transformer for producing an alternating current potential having an amplitude proportional to transducer potential above the standard reference level, a cascaded amplifier for amplifying the alternating current potential, a transformer and bridge rectified for converting the amplified alternating current potential to a direct current potential proportional to the amplitude of the amplified alternating current potential, a condenser input filter for filtering the direct current potential from said bridge rectifier, first and second differentiation circuits for producing an acceleration potential proportional to the acceleration of the direct current potential from said bridge rectifier, an amplifier including a control grid on which is impressed the acceleration potential from said second differentiating circuit, and a control circuit including a thyratron including a cathode and a control grid, the amplified acceleration potential being impressed upon the control grid of said thyratron and the cathode being biased to prevent current flow in the control circuit until the acceleration potential equals or exceeds a predetermined value, a direct current power supply for said balancing circuit, amplifiers and control circuit, and a bridging capacitor circuit interconnecting said first-named amplifier and the thyratron control grid whereby the amplified alternating current potential, proportional to transducer output above reference, is amplified and supplied directly to the control grid of said thyratron for triggering it and energizing said control circuit at a preselected value of alternating current.

6. The combination comprising: a transducer for producing a direct current potential proportional to a quantity under investigation; a null balancing network including a source of reference potential representative of a fixed reference quantity; means for comparing said direct current potential and said fixed reference potential to produc a direct current difference voltage which is the difference in voltage between said potentials, and which is representative of the difference between said quantity under investigation and said fixed reference quantity; a first differentiating circuit; a second differentiating circuit; means successively applying said difference voltage to said first and second differentiating circuits for deriving an acceleration voltage which is the second derivative with respect to time of said difference voltage; a control circuit; an electronic switch in said control circuit for controlling the energization of said control circuit, said electronic switch having first and second input circuits, said acceleration voltage being coupled to said first input circuit, said difference voltage being coupled to said second input circuit, said electronic switch being biased for non-conduction until said first acceleration voltage exceeds a first predetermined amount, or until said difference voltage exceeds a second predetermined amount, whereupon said electronic switch conducts and said control circuit is energized whenever the rate of acceleration with respect to time of said quantity under investigation exceeds a predetermined amount or whenever the difference between the quantity under investigation and the reference quantity exceeds another predetermined amount.

References Cited in the file of this patent

UNITED STATES PATENTS

| | | |
|---|---|---|
| 2,408,711 | Volz | Oct. 1, 1946 |
| 2,464,708 | Moseley | Mar. 15, 1949 |
| 2,524,053 | Halpert | Oct. 3, 1950 |
| 2,628,344 | Johnson et al. | Feb. 10, 1953 |
| 2,654,860 | Lewis | Oct. 6, 1953 |
| 2,703,203 | Bishop | Mar. 1, 1955 |
| 2,730,304 | Markow et al. | Jan. 10, 1956 |
| 2,782,246 | Evans | Feb. 19, 1957 |

UNITED STATES PATENT OFFICE
CERTIFICATION OF CORRECTION

Patent No. 2,976,523

March 21, 1961

Thomas H. Duffy

It is hereby certified that error appears in the above numbered patent requiring correction and that the said Letters Patent should read as corrected below.

Column 3, line 36, for "the magntiude" read -- the amplitude --; column 4, line 55, for "tempgerature" read -- temperature --; column 7, line 31, for "valve" read -- value --; lines 40 and 41, for "eneriged" read -- energized --; same column 7, line 46, and column 8, line 11, for "valve", each occurrence, read -- value --; column 9, line 54, for "trigged" read -- triggered --; column 11, line 28, for "produc" read -- produce --.

Signed and sealed this 15th day of August 1961.

(SEAL)
Attest:

ERNEST W. SWIDER
Attesting Officer

DAVID L. LADD
Commissioner of Patents